US007280907B2

(12) United States Patent
Hawkins et al.

(10) Patent No.: US 7,280,907 B2
(45) Date of Patent: Oct. 9, 2007

(54) METHOD OF ENHANCING ACCELERATOR PEDAL SAFETY INTERLOCK FEATURE

(75) Inventors: Jeffery Scott Hawkins, Farmington Hills, MI (US); Dennis Michael Letang, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 96 days.

(21) Appl. No.: 11/359,634

(22) Filed: Feb. 22, 2006

(65) Prior Publication Data

US 2007/0198165 A1 Aug. 23, 2007

(51) Int. Cl.
*G06F 19/00* (2006.01)
*F02D 41/00* (2006.01)

(52) U.S. Cl. ........................ 701/110; 123/350; 701/111

(58) Field of Classification Search ................ 701/101, 701/110, 111; 123/350, 351, 352
See application file for complete search history.

(56) References Cited

U.S. PATENT DOCUMENTS 4,491,079 A 1/1985 Gustavsson
4,622,867 A * 11/1986 Nishioka et al. .............. 477/46
5,243,526 A * 9/1993 Ito et al. ........................ 701/90
5,528,444 A 6/1996 Cooke et al.
5,528,445 A 6/1996 Cooke et al.
6,172,428 B1 1/2001 Jordan
6,371,081 B1 4/2002 Hawkins et al.
6,512,966 B2 1/2003 Lof et al.
6,640,469 B1 11/2003 McKenzie et al.
6,671,585 B2 12/2003 Lof et al.
6,814,053 B2 11/2004 Hawkins et al.
6,904,352 B2 6/2005 Hawkins et al.
6,915,782 B2 * 7/2005 Hanada et al. .............. 123/399

* cited by examiner

*Primary Examiner*—John T. Kwon
(74) *Attorney, Agent, or Firm*—Rader, Fishman & Grauer, PLLC

(57) ABSTRACT

A method for an accelerator pedal safety in a vehicle with an internal combustion engine having an Electronic Control Unit, (ECU), said method comprising: starting the engine; determining whether the engine is running; determining whether there is a request for additional torque; determining whether an inhibit is enabled; determining whether the vehicle speed is above a preset threshold; enabling the accelerator pedal torque request; and, logging a fault in the ECU and enabling the appropriate lamps or visual fault indicators.

10 Claims, 2 Drawing Sheets

METHOD OF ENHANCING ACCELERATOR PEDAL SAFETY INTERLOCK FEATURE

BACKGROUND OF THE INVENTION

1. Field of the Invention

The present invention relates to a method and system of enhancing accelerator pedal safety interlock systems that utilize an input to determine the status of the vehicle condition and the corresponding accelerator pedal safety interlock. Typically, accelerator pedal safety interlock systems use a discrete input which don't allow for circuit continuity checks (e.g. input is either open or closed and cannot detect a short circuit to either power or ground, or an open circuit). Although circuit continuity failure may be unable to be measured electrically, a fault may be determined based on a rationality check. If it is determined that the input is illogical (e.g. accelerator pedal interlock requests the accelerator pedal be inhibited at a high rate of vehicle speed the illogical request to inhibit the vehicle accelerator pedal request may be ignored, allowing continued operation of the vehicle. If an illogical request to inhibit the accelerator pedal is received at a high rate of vehicle speed, the accelerator pedal inhibit should be disabled until the switch is disabled until the switch is validated. A calibratible torque derate option should be provided to optionally reduce the amount of available engine torque in the event that a fault is detected. Limiting the engine torque will limit the overall operation of the vehicle but will still permit the vehicle to operate until the fault condition can be diagnosed.

2. Description of the Related Art

Hawkins et al., U.S. Pat. No. 6,814,053 discloses an engine control system for compression ignition engines that employ a microprocessor-based controller to detect engine operation in a speed range previously determined to be undesirable, and responding to the detection by changing the operation of the engine. In the preferred embodiment, the controller commands a parameter for adjusting engine operation to each a different speed outside of first and second thresholds defining the undesirable range in a time period subsequent to the detection.

McKenzie et al., U.S. Pat. No. 6,640,469 discloses a vehicle and a device for limiting the speed operation of the vehicle if the engine is overloaded.

Hawkins et al., U.S. Pat. No. 6,371,081 discloses an engine controller capable of operating in both a torque governing mode and a speed governing mode simultaneously, and a method of operation whereby speed governing may be enabled and disabled while simultaneously providing a valid speed request signal to the controller. The speed governor signal has an enabled state and a disabled state and is generated external to the controller and monitored by the speed governor. The speed request signal is simultaneously monitored by the speed governor. The speed governor is operative to control the speed of the engine proportional to the speed request signal while the speed governor signal is in the enabled state. The speed governor is disabled by the setting the speed governor signal into the disabled state. A torque governor may also be operational within the controller. The torque governor monitors a torque request signal that it uses to control a torque generated by the engine.

SUMMARY OF THE INVENTION

Accelerator interlock features for heavy duty vehicles as well as for bus and mass transit vehicles are desirable and known in the art. Currently, a fault condition may go undetected if the function is implemented with a digital input that has only two states (On\Off or inhibit accelerator pedal\don't inhibit accelerator pedal.) If the fault is detected, the vehicle must either always inhibit the accelerator pedal or choose to ignore the inhibit until the fault condition has been analyzed and corrected. Therefore, there is a need for an improved accelerator interlock safety feature that permit the vehicle operator to operate a vehicle if an illogical request is received to inhibit the accelerator pedal during vehicle operation above a minimum speed threshold until the fault condition is verified. In addition, it is an improvement in the art to permit the operator to continue operation of a vehicle, albeit with a derated torque, at any time when a fault condition is detected but before a fault condition is verified. These and other improvements will become apparent upon a reading of the description of the present invention.

The present invention is directed to a method to enhance the accelerator pedal safety interlock feature that utilizes input to determine the status of the vehicle condition. The method is comprised of the steps of starting the engine, determining whether the engine is running, determining whether there is an operator request for engine torque, i.e., whether the accelerator pedal is depressed, determining whether the accelerator pedal inhibitor is enabled, determining whether the vehicle speed is above a preset maximum threshold, honoring the accelerator request for torque and logging the circuit fault, enabling warning lamps and, optionally, derating available engine torque in the event the vehicle is calibrated for torque derate.

These and other advantages will become apparent to those of skill in the art upon reading the description of the invention.

Figure 1:
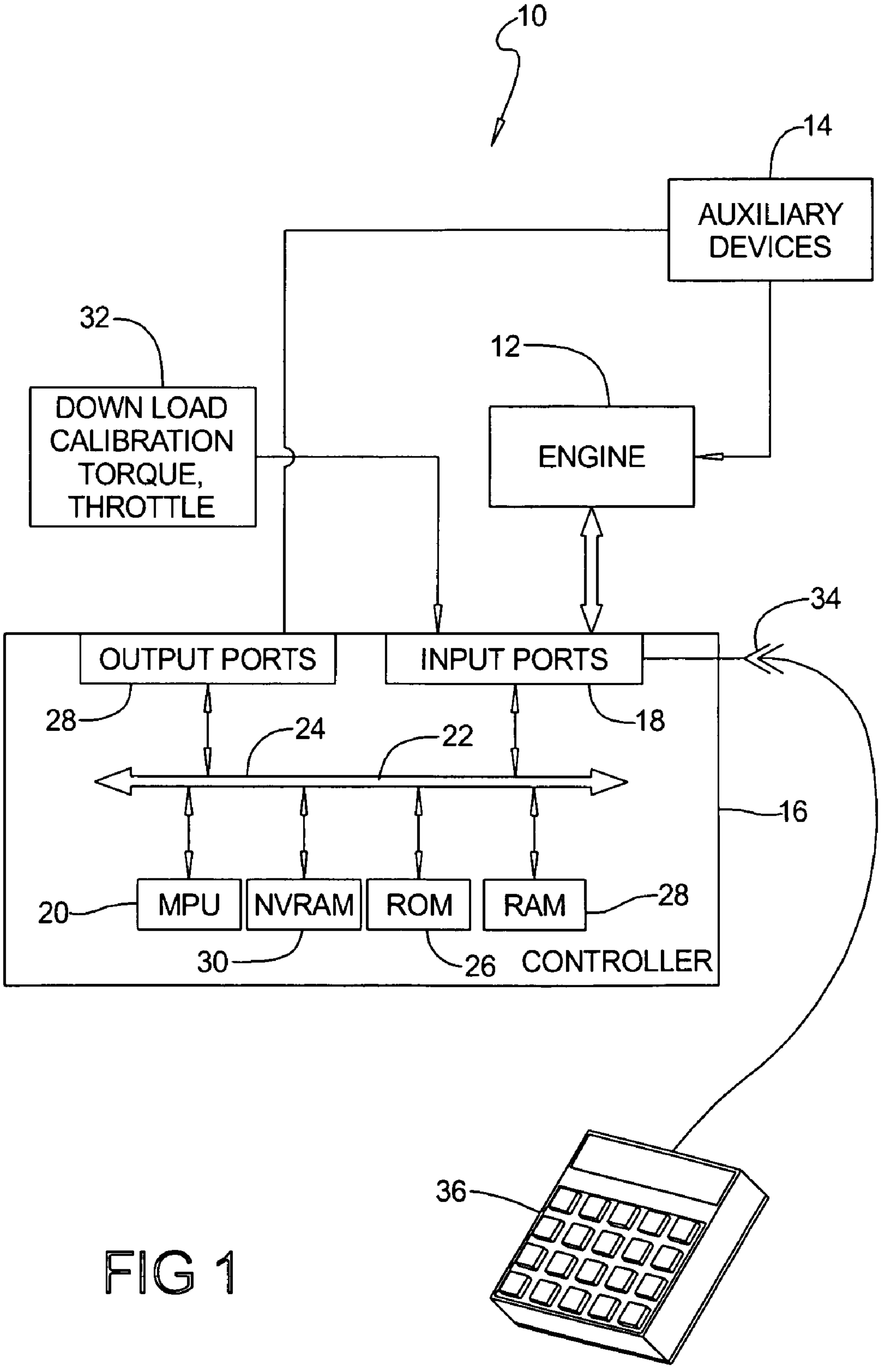
FIG. 1 is a block diagram illustrating a system for enhanced accelerator pedal safety interlock according to the present invention.

Referring now to the drawings wherein like numerals refer to like structures, and in particularly to FIG. 1, the vehicle accelerator inhibit system 10 includes engine 12 having a plurality of cylinders fueled by fuel injection by fuel injectors or common rail. In the preferred embodiment, the engine 12 is a compression ignition and internal combustion engine such as a four, six, eight, twelve, sixteen or twenty-four cylinder diesel engine or a diesel engine having any other desired number of cylinders. The fuel injectors are receiving pressurized fuel from a supply connected to one or more high or low-pressure pumps (not shown) as is well known to those who are skilled in the art. Alternatively, embodiments of the present invention may employ a plurality of unit pumps (not shown) with each pump supplying fuel to one of the injectors. The system may also include an ignition and, a starter, such as is well known to those of ordinary skill in the art. A controller 16 preferably includes a microprocessor 20 in communication with various computer readable storage media 32 via data and control bus 24. Computer readable storage data may include any of a number of known devices which function as a read only memory (ROM), radium access memory (RAM), non-volatile random access memory (NVRAM) and the like. The computer readable storage media may be implemented by any of a number of known physical devices capable of storing data representing instructions executable via a computer such as a controller. Known devices may include, but are not limited to PROM, EPROM, EEPROM, flash memory, and the like in addition to magnetic, optical, and combination media capable of temporary permanent data storage.

DETAILED DESCRIPTION OF THE PREFERRED EMBODIMENT(S)

The computer readable storage media includes various programs, instructions, software and control logic to effect control of various systems and sub-systems of the vehicle, such as the engine 12, the vehicle transmission, the ignition, the starter and the like. The controller receives signals from sensors via input ports and generates output signals that may be provided to various actuators and all components via the output ports. A data, diagnostics and programming interface 36 may also be selectively connected to the controller by a plug 34 to exchange information. The interface may be used to change values within the computer readable storage such as configurations settings, control logic, and the desired accelerator pedal safety interlock feature, when present.

In accordance with the present invention, the system is configured electronically via a set of calibrations and an accelerator pedal safety interlock feature is downloaded with other calibrations necessary to operate the engine through an interface to the controller to activate and deactivate an accelerator pedal safety interlock feature mode of engine operation. Of course in accordance with the present invention, there may be more than one accelerator pedal safety interlock mode and preferably there are several accelerator pedal safety interlock features that the vehicle operator may choose from including a mode wherein an illogical accelerator pedal inhibit request is detected and the accelerator safety interlock is not enabled, an immediate activation of and accelerator safety interlock mode wherein a torque derate operates to limit the engine, or permit the engine to continue to operate at normal throttle and torque when engine operation initiates before a circuit fault is confirmed. It is contemplated that the accelerator pedal safety interlock feature may be changed using any hand held device such as known in the art, so long as it is compatible with the ECU software.

In a preferred embodiment, the engine controller unit (ECU) monitors sensors and the display device interface and executes control logic in hardware and or software. Preferably, the controller is a DDEC controller available from Detroit Diesel Corporation of Detroit, Mich. Various other features of this controller are described in detail U.S. Pat. Nos. 5,477,827 and 5,445,128, it is the disclosure of which are hereby incorporated by reference. However, it is contemplated that this invention may be adapted for use with any engine controller.

It will be appreciated by those of ordinary skill in the art, that the control logic may be implemented or effected in hardware, software, or a combination of hardware and software. The various functions are preferably affected by a programmed microprocessor, such as the DDEC controller that may include one or more functions implemented by dedicated electric, electronic or integrated circuits. As will also be appreciated, the control logic may be implemented using any number of many programming and processing techniques and strategies and is not limited to the order or sequence illustrated here which is merely for convenience. Parallel processing and multi-tasking systems and the methods may be used to accomplish the objects, features and advantages of the present invention. The present invention is independent of the particular programming language, operating system, or processor used to implement the control logic illustrated.

Figure 2:
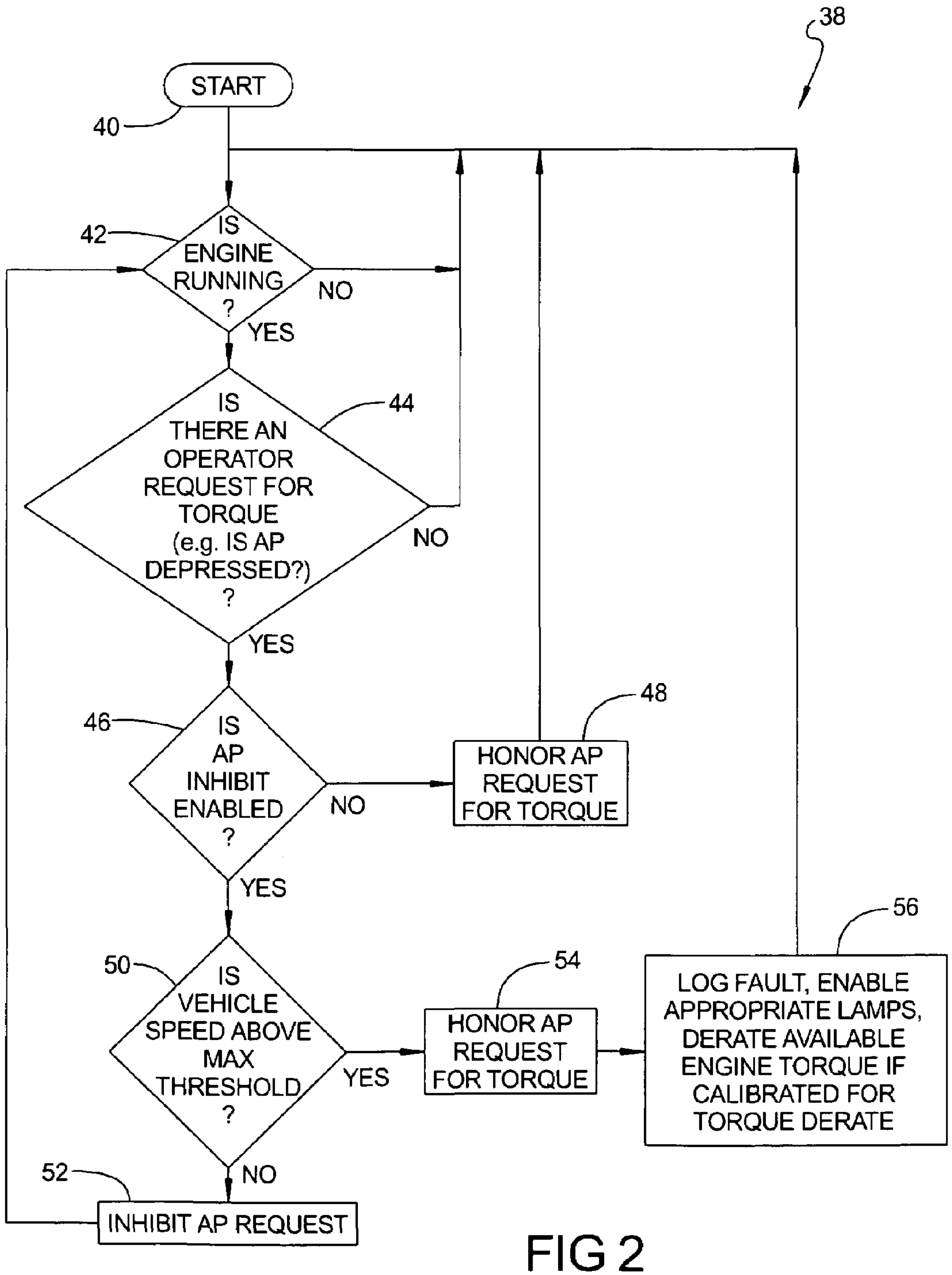
FIG. 2 is a flow chart diagram showing the steps of the method to enhance accelerator pedal safety interlock feature.

Turning now to FIG. 2, there is depicted a flow diagram of the logic in one embodiment of the invention. Method 38 begins with step 40, which is start of the engine. When the engine is started, a determination is made at step 42 whether the engine is running. If no, the software loops back to the inquiry of whether the engine is running. If the determination at step 42 is yes, the engine is running, then a determination is made at step 44, whether the operator has made a request for torque, i.e., whether the accelerator pedal depressed. If the accelerator is not depressed, or there is no request for torque, the software loops back to the beginning of the method. If the answer to the inquiry at step 44 is yes, then a determination is made at step 46 is whether the accelerator pedal inhibit is enabled. If the determination at step 46 is no, then the method honors the accelerator request for torque at indicated in step 48, and the method loops back to the beginning inquiry of whether the engine is running. If the answer to the determination at step 48 is yes, step 50 determines whether the vehicle speed is above a maximum preset threshold. If the answer to the inquiry in step 50 is no, the method inhibits the accelerator pedal request at step 52, and then the method loops back to the initial step 42 of determining whether the engine is running. If the answer to the determination at step 50 is yes, step 54 directs the system to honor the accelerator request for torque. Once the accelerator request for torque is honored, step 56 is logs the fault, enables the appropriate warning lights, and optionally will derate the available engine torque that the engine ECU is calibrated for torque derate in the event a fault is logged.

There are certain scenarios in which an engine overspeed can occur and the acceleration inhibit for torque will be honored. One such scenario is one in which an engine is damaged due to an overspeed condition After cresting the top of a hill, if the operator keeps his foot on the accelerator pedal, the engine compression brakes will not enable. This is because in order to enable the engine the brakes, the electronic engine controller requires the accelerator pedal position be at zero degree position. In the event of an engine overspeed that can potentially cause engine damage it is beneficial to inhibit the accelerator request. There is no negative impact as most engine calibrations have little or no fueling at such high levels above rated engine speed. When the engine speeds reaches a programmable overspeed threshold, a digital output will be switched to ground. The digital output is connected to the throttle inhibit digital input. Grounding the input enables the throttle inhibit function, thereby inhibiting the throttle request.

The method of the present invention is typically implemented in the ECU. The ECU may be connected to an electronic bus implemented in a vehicle. In one example, the electronic bus may be a digital communication link. In one example the digital communication link may be an SAE, J1939 digital communication link. The accelerator pedal inhibit feature may communicate with the ECU over the digital communication link. Alternatively, the accelerator pedal feature may be wired directly to the ECU inputs and/or outputs and the ECU may broadcast the torque derate or the accelerator pedal inhibit feature to other electronic components in the vehicle control system over the digital communication link. While the method 38 has been described as implemented in an automotive ECU, the method 38 may be implemented in any type of microprocessor or controller to meet the design requirements of a particular application.

While the embodiments of the invention have been described as set forth herein, it is understood that these embodiments are illustrative and various changes and modifications may be made without departing from the scope and spirit of the invention.

We claim:

1. A method for an accelerator pedal safety in a vehicle with an internal combustion engine having an Electronic Control Unit, (ECU), said method comprising:

a) starting the engine;

b) determining whether the engine is running;

c) determining whether there is a request for additional torque;

d) determining whether an inhibit is enabled;

e) determining whether the vehicle speed is above a preset threshold;

f) enabling the accelerator pedal torque request, and;

g) logging a fault in the ECU and enable visual indicators of fault.

2. The method of claim 1, wherein determining whether there is a request for additional torque is comprised of determining the extent of accelerator pedal is depressed.

3. The method of claim 1, further including honoring the accelerator pedal request for torque when said accelerator pedal inhibit is not enabled.

4. The method of claim 1, further including inhibiting the accelerator pedal torque request when said vehicle speed is not above a preset maximum threshold value.

5. The method of claim 1, further including a torque derate feature to be activated when the vehicle speed is below a present maximum value.

6. A method for a accelerator pedal safety in a vehicle with an internal combustion engine having an Electronic Control Unit, (ECU), said method comprising:

a) starting the engine;

b) determining whether the engine is running;

c) determining whether there is a request for additional torque;

d) determining whether an inhibit torque is enabled;

e) determining whether the vehicle speed is above a preset threshold;

f) enabling a torque derate when said vehicle is below a preset speed and;

g) enabling the accelerator pedal torque request and;

h) logging a fault in the ECU and enable visual indicators of fault.

7. The method of claim 6, wherein determining whether there is a request for additional torque is comprised of determining the extent of accelerator pedal is depressed.

8. The method of claim 6, further including honoring the accelerator pedal request for torque when said accelerator pedal inhibit is not enabled.

9. The method of claim 6, further including inhibiting the accelerator pedal torque request when said vehicle speed is not above a preset maximum threshold value.

10. The method of claim 6, further including inhibiting the accelerator pedal torque request when said engine speed is above a preset minimum threshold value.

* * * * *